V. P. HERBOLD.
SCYTHE.
APPLICATION FILED OCT. 30, 1906.
962,638.
Patented June 28, 1910.
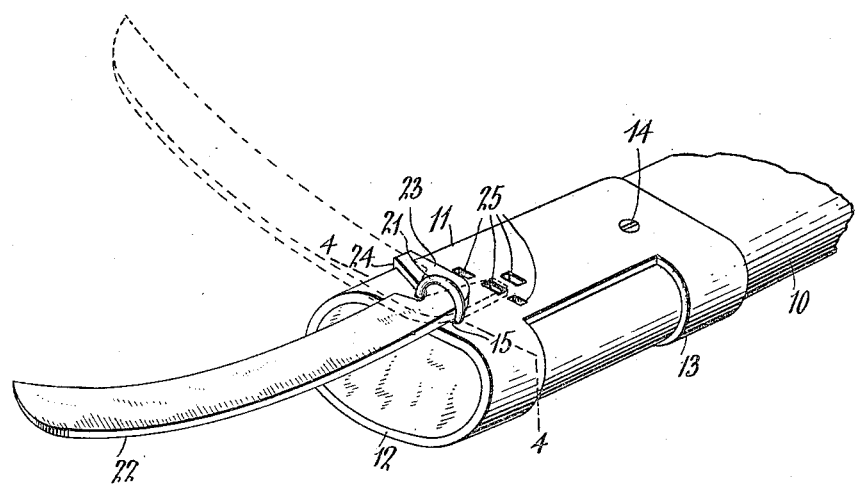
*Fig. 1.*
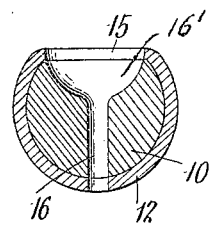
*Fig. 4.*
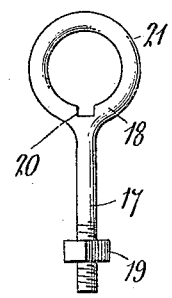
*Fig. 2.*
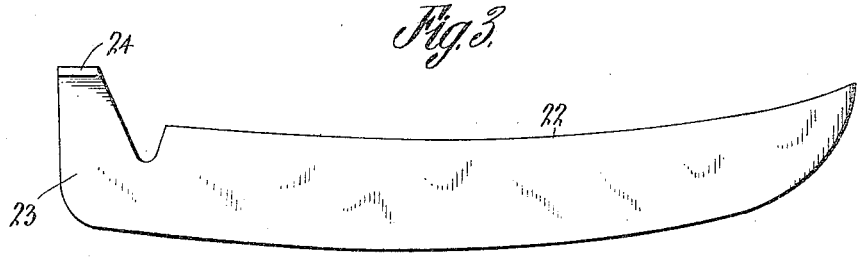
*Fig. 3.*
Witnesses
J. H. Crawford
Inventor
Victor P. Herbold
By 
Attorneys

UNITED STATES PATENT OFFICE.

VICTOR P. HERBOLD, OF NEWTON, IOWA.

SCYTHE.

962,638.

Specification of Letters Patent. Patented June 28, 1910.

Application filed October 30, 1906. Serial No. 341,216.

*To all whom it may concern:*

Be it known that I, VICTOR P. HERBOLD, a citizen of the United States, residing at Newton, in the county of Jasper, State of Iowa, have invented certain new and useful Improvements in Scythes; and I do hereby declare the following to be a full, clear, and exact description of the invention, such as will enable others skilled in the art to which it appertains to make and use the same.

This invention has for its object the provision of improvements in means for attaching the shank at the heel of the scythe to the snathe, and at the same time strengthening the end of the snathe, so that the scythe will not become loose in its fastenings nor will the snathe be liable to breakage.

The improvements may be applied to scythes and their snathes adapted for any use, though they are particularly adapted for employment on brambling or brush scythes which are also used for cutting the bottom of corn-shocks from the ground to which they may have become frozen, in which uses great strain is put upon the scythe and its snathe.

The nature of the invention is fully disclosed by the device portrayed in the annexed drawing, forming a part of this specification, in view of which the improvements will be described with respect to their construction and manner of use and then be pointed out in the subjoined claim.

Of the said drawings,—Figure 1 is a perspective view of the lower end of a scythe snathe. Fig. 2 is a perspective view of the fastening eye-bolt. Fig. 3 is a similar view of a scythe. Fig. 4 is a sectional detail in the plane of line 4—4.

Similar numerals of reference designate similar parts or features, as the case may be, wherever they occur.

In the drawings 10 designates the scythe snathe, the end of which that is designed to have the heel of the scythe secured thereto being slightly flattened as usual and upon this the flat plate 11 is placed, said plate having bands 12 and 13 connected at its ends and forming an integral part of the plate and encompassing the snathe 10. The latter is secured upon the snathe from removal endwise by a screw 14 passing through the plate, and tapped into the snathe. An oblong slot 15 is formed through the plate 11 near its outer end which slot communicates or registers with a socket 16, having a flared mouth 16' made through the snathe near its end to receive the shank 17 of an eye-bolt 18, screw-threaded at its lower outer end to receive the nut 19, and having a notch, 20, formed in the central part of the lower wall of the eye 21 of the said bolt. The purpose of this notch 20 is to permit the introduction of the shank 23 through the eye 21 of the bolt, said eye being of less diameter horizontally than the greatest width of the shank. This arrangement prevents the accidental disengagement of the blade from the handle.

22 designates the scythe provided with a usual shank, 23, having the claw 24 at its end. The plate 11 is furthermore provided with a plurality of rectangular perforations, 25, at a suitable point inward from the slot 15, which rectangular openings or perforations are provided for the reception of the claw 24 of the shank of the scythe.

The scythe is connected with the snathe by arranging the eye-bolt 18 in the slot 15, mouth 16' and hole 16, which latter also extends through the bottom of the band 12. The shank 23 of the scythe is then passed through the eye 21 of the eye-bolt by holding the blade substantially in the direction of the shank of said bolt so that the shank will rest in the notch 20. The blade is then turned either to the position shown in full lines in Fig. 1 or to the position shown in dotted lines in that figure. In the first instance the position is that when the device is used as a corn knife or bush hook while the dotted line position shows the position for use as a scythe. In the full line position the end 24 is hooked over the edge of the plate 11 while in the dotted line position this end is set in one of the openings 25. The nut 19 is then screwed on to the bolt 17 and the eye pulled solidly down so that it holds the blade firmly in position.

The several perforations 25 in the plate are provided for adjusting the scythe so that it may stand at various angles with respect to the general line of the snathe.

What is claimed is:—

The combination with a scythe blade, having a shank; of a handle, the snathe of which is provided with a flattened surface, of a perforated flat plate adapted to fit upon said flattened surface and having an oblong slot and an integral band at each end, said bands encompassing the snathe end of said scythe handle, said snathe having a socket and a perforation communicating with said oblong slot, and an eye-bolt passing through said slot and snathe perforation and one of said bands, to secure said scythe blade to said handle in the manner set forth, the eye of said bolt being provided with a notch adjacent the shank and being of less width than the widest part of said shank.

In testimony whereof, I affix my signature in presence of two witnesses.

VICTOR P. HERBOLD.

Witnesses:
HARRY B. ALLFREE,
H. I. ALLFREE.